United States Patent
An et al.

(10) Patent No.: US 6,679,930 B1
(45) Date of Patent: Jan. 20, 2004

(54) DEVICE FOR REDUCING PRESSURE LOSS OF CYCLONE DUST COLLECTOR

(75) Inventors: Hyeok Seong An, Kyeongsangnam-do (KR); Kyeong Seok Lim, Kyeongsangnam-do (KR); Dong Jin Kwak, Kyeongsangnam-do (KR); Bong Seok You, Kyeongsangnam-do (KR); Seong Hwa Lee, Kyeongsangnam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/048,125

(22) PCT Filed: Mar. 15, 2000

(86) PCT No.: PCT/KR00/00211
§ 371 (c)(1),
(2), (4) Date: Feb. 5, 2002

(87) PCT Pub. No.: WO00/64321
PCT Pub. Date: Nov. 2, 2000

(30) Foreign Application Priority Data

| Apr. 23, 1999 | (KR) | 1999/14680 |
| Jun. 4, 1999 | (KR) | 1999/20714 |
| Mar. 11, 2000 | (KR) | 2000/12260 |

(51) Int. Cl.$^7$ ............................................. B01D 45/12
(52) U.S. Cl. ........................... 55/337; 55/416; 55/459.1
(58) Field of Search ........................... 55/318, 414, 416, 55/337, 459.1

(56) References Cited

U.S. PATENT DOCUMENTS

| 967,849 | A | * | 8/1910 | Steiner | 55/410 |
| 2,010,128 | A | * | 8/1935 | Arnold | 209/710 |
| 6,350,292 | B1 | * | 2/2002 | Lee et al. | 55/459.1 |

FOREIGN PATENT DOCUMENTS

| JP | 60-147267 | | 8/1985 |
| JP | 62-19268 | * | 1/1987 |
| JP | 2-29740 | | 2/1990 |
| JP | 03-186368 | | 8/1991 |
| SU | 1458016 | | 2/1989 |
| SU | 1667937 | | 8/1991 |

* cited by examiner

Primary Examiner—Robert A. Hopkins
(74) Attorney, Agent, or Firm—Harness, Dickey & Pierce, P.L.C.

(57) ABSTRACT

A device for reducing pressure loss of a cyclone dust collector is disclosed, in which a turbulence flow generated when inlet air into a cyclone body is discharged out through an air outlet passage can be laminated. The device for reducing pressure loss of a cyclone dust collector prevents fine dust as well as relatively weight dust from being contained in discharge air. The device for reducing pressure loss of a cyclone dust collector includes: a cyclone body 100; an air inlet passage 110 connected with the cyclone body; for sucking air and foreign materials; an air outlet passage 120 for discharging the air sucked into the cyclone body; a foreign material outlet hole 100a for discharging the foreign materials separated from the air in the cyclone body; and a laminar flow means 140 provided on an axial line along the air outlet passage, wherein the air discharged through the air outlet passage 120 loss its rotative force by the laminar flow means 140 so that air flow in the air outlet passage 120 and the air inlet passage is laminated.

10 Claims, 11 Drawing Sheets

DEVICE FOR REDUCING PRESSURE LOSS OF CYCLONE DUST COLLECTOR

This application is the national phase under 35 U.S.C. §371 of PCT International Application No. PCT/KR00/00211 which has an International Filing Date of Mar. 15, 2000, which designated the United States of America.

TECHNICAL FIELD

The present invention relates to a cyclone dust collector, and more particularly, to a device for reducing the intensity of turbulence generated in a cyclone dust collector.

BACKGROUND OF THE RELATED ART

Generally, a vacuum cleaner sucks indoor air using suction force and separates various kinds of foreign materials from the air to collect the foreign materials. There are various types of cyclone dust collectors, and specially there are a cyclone dust collector in which an inlet of air and an outlet of air are in forward direction, and another cyclone dust collector in which an inlet or air and an outlet of air are in reverse direction(or tangent direction).

U.S. Pat. Nos. 3,870,486, 4,853,008, 4,373,228, 4,643,738, 4,593,429, 5,080,697, 5,135,552, and 5,160,356 disclose cyclone dust collectors in which an air flow is in reverse direction. U.S. Pat. No. 5,350,432 discloses a cyclone dust collector in which an air flow is in forward direction.

A cyclone dust collector in which an air inlet flow is reverse to an air outlet flow will be described with reference to FIG. 1 to FIG. 3.

In other words, a related art cyclone dust collector includes a cone-shaped cyclone body 10, an air inlet passage 11 for sucking indoor air and foreign materials, an air outlet passage 12 for discharging air, and a collector tub 13 for collecting the foreign materials separated from the air.

The air inlet passage 11 extends to the cyclone body 10 along tangent direction. The air outlet passage 12 has one end which passes through a top end of the cyclone body 10 to be located inside the cyclone body 10. The collector tub 13 is located at the bottom of the cyclone body 10 and communicates with the inside of the cyclone body 10 by a foreign material outlet hole 10a.

Thus, if a suction force is generated inside the cyclone body 10, air containing dust flows into the cyclone body 10 through the air inlet passage 11. At this time, the air inlet passage 11 extends from an outer circumference of the cyclone body 10 to tangent direction so that a centrifugal force is applied to the air flowed into the cyclone body 10. That is to say, the air and foreign materials instantaneously flowed into the cyclone body 10 rotate along an inner wall of the cyclone body 10 so that a centrifugal force is generated. Accordingly, the foreign materials having a mass are separated from the air having almost no mass, and flow along the inner wall of the cyclone body 10. Then, the foreign materials descend by its tare, so that the foreign materials are collected into the collector tub 13 through the foreign material outlet hole 10a.

In other words, by the relation of the following equation 1, the air having a mass almost close to 0 is not subjected to a centrifugal force while the foreign materials having a mass rotate along the inner wall of the cyclone body 10 by a centrifugal force.

$$F = me\omega^2, \qquad \text{[Equation 1]}$$

where F is a centrifugal force, m is a mass, e is a distance between the center of the cyclone body and its inner wall, and $\omega$ is an angular velocity.

The air separated from the foreign materials is discharged out through the air outlet passage 12 along discharge air that ascends along the center of the cyclone body 10.

However, the descending air sucked into the cyclone body 10 interferes with a discharge air that ascends from the bottom of the cyclone body 10. Thus, a turbulence area is generated as shown in a portion "A" of FIG. 2.

The interference is caused because of a rotative force of the discharge air and a smaller sectional area of the cyclone body 10 than a sectional are of the air outlet passage 12.

The turbulence flow increases noise and causes pressure loss when the cyclone collector is operating, thereby reducing collecting efficiency of the dust. In other words, the dust flowing into the bottom of the cyclone body 10 and the collector body 13 is contained in the discharge air which is discharged through the air outlet passage 12, thereby reducing the overall collecting efficiency.

Particularly, since the foreign materials which are not discharged are rotating at the bottom of the cyclone body 10, where the dust discharge hole 10a is located, the foreign materials are likely to be contained in the discharge air.

Also, the discharged fine dust flows into various components for generating a suction force, specially a fan motor, thereby damaging them.

Thus, to solve above problems, a separate filter should additionally be provided inside a body of the vacuum cleaner when the related art cyclone collector is applied to a vacuum cleaner.

DISCLOSURE OF INVENTION

Accordingly, the present invention is directed to a device for reducing pressure loss of a cyclone dust collector that substantially obviates one or more of the problems due to limitations and disadvantages of the related art.

An object of the present invention is to provide a device for reducing pressure loss of a cyclone dust collector, in which a turbulence flow generated when inlet air into a cyclone body is discharged out through an air outlet passage can be laminated.

Another object of the present invention is to provide a device for reducing pressure loss of a cyclone dust collector, in which fine dust as well as relatively weight dust is prevented from being contained in discharge air.

Additional features and advantages of the invention will be set forth in the description which follows, and in part will be apparent from the description, or may be learned by practice of the invention. The objects and other advantages of the invention will be realized and attained by the structure particularly pointed out in the written description and claims hereof as well as the appended drawings.

To achieve these and other advantages and in accordance with the purpose of the present invention, as embodied and broadly described, a device for reducing pressure loss of a cyclone dust collector includes: a cyclone body; an air inlet passage connected with the cyclone body, for sucking air and foreign materials; an air outlet passage for discharging the air sucked into the cyclone body; a foreign material outlet hole for discharging the foreign materials separated from the air in the cyclone body; and a laminar flow means provided on an axial line along the air outlet passage, wherein the air discharged through the air outlet passage loses its rotative force by the laminar flow means so that air flow in the air outlet passage and the air inlet passage is laminated.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Figure 1:
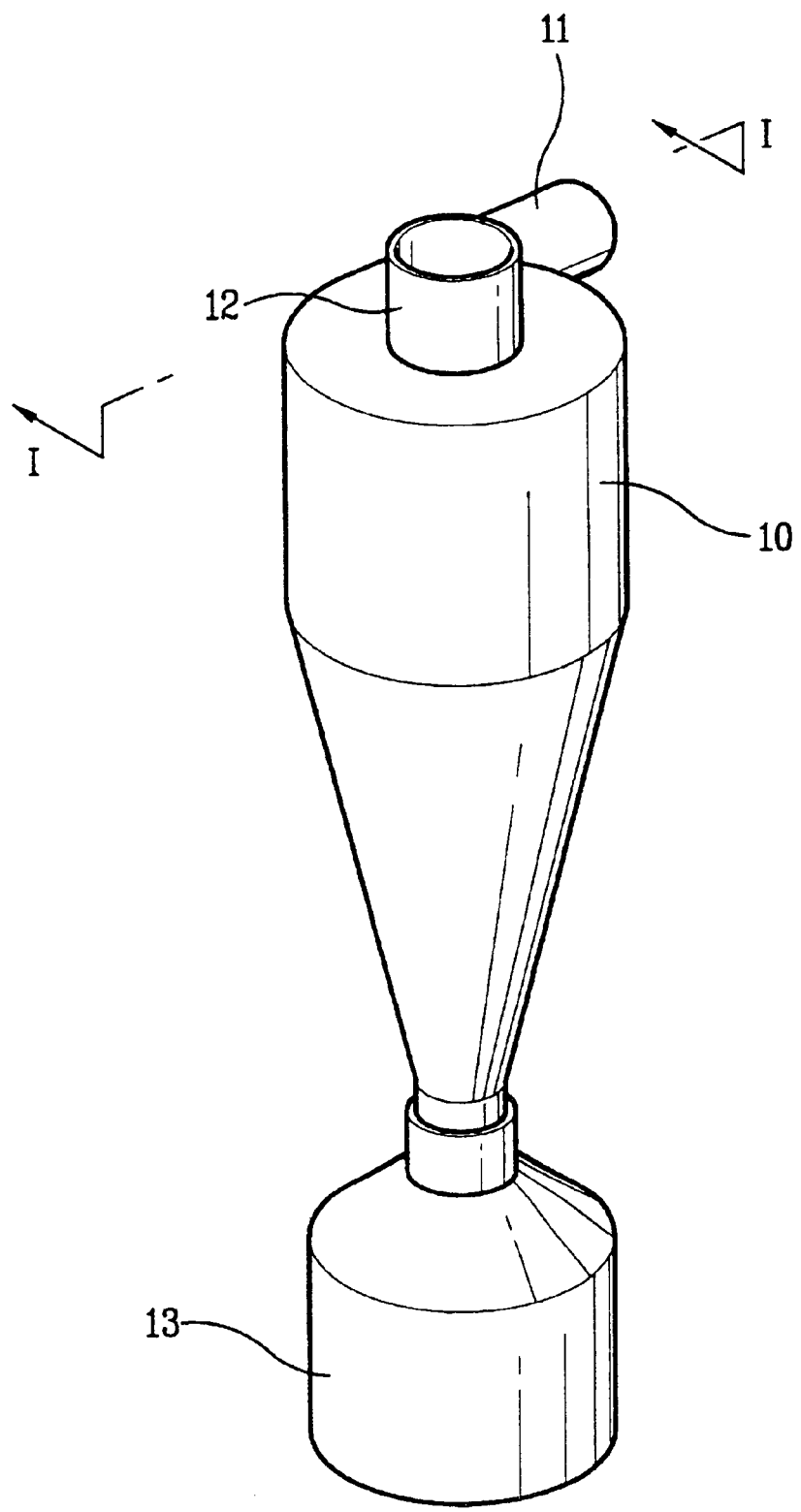
FIG. 1 is a perspective view showing a related art cyclone dust collector.
Figure 2:
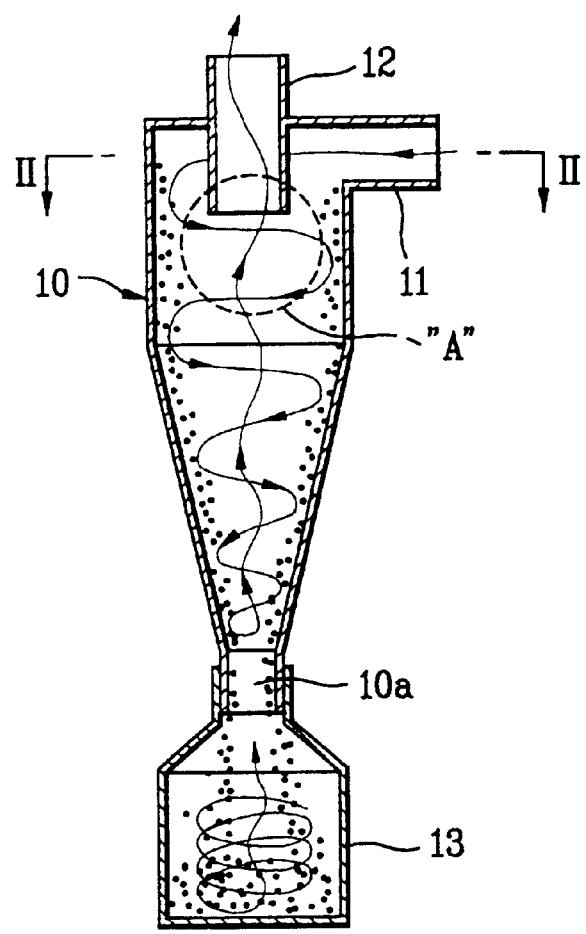
FIG. 2 is a sectional view taken along line I—I of FIG. 1.
Figure 3:
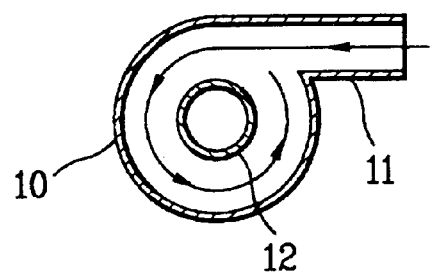
FIG. 3 is a sectional view taken along line II—II of FIG. 1.
Figure 4:
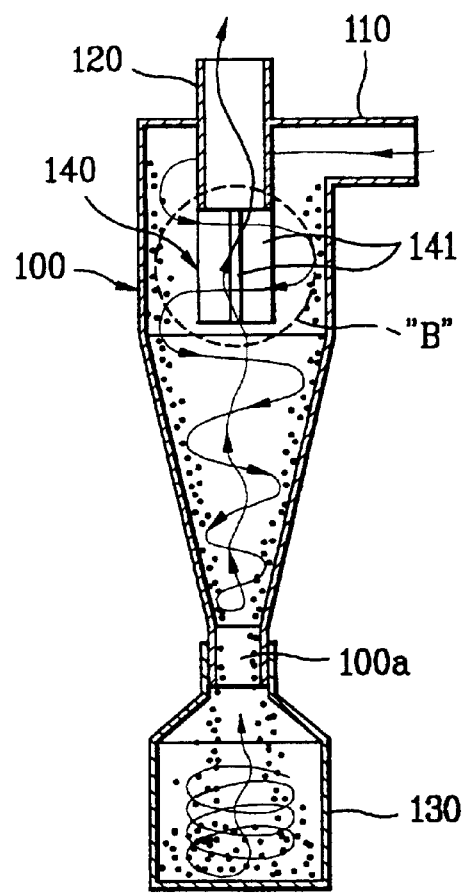
FIG. 4 shows a first embodiment of the present invention and is a longitudinal sectional view showing a reverse cyclone dust collector, to which a cross blade is applied.
Figure 5:
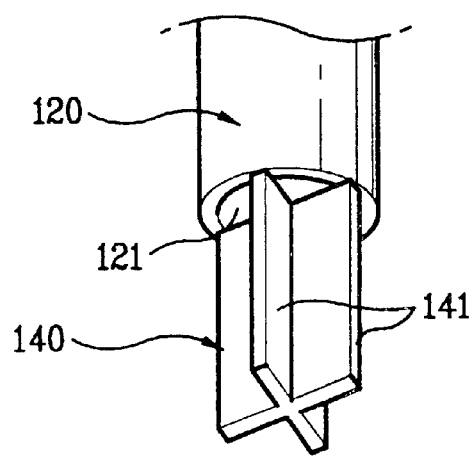
FIG. 5 is a detailed perspective view of a portion "B" of FIG. 4.

Reference will now be made in detail to the preferred embodiments of the present invention, examples of which are illustrated in the accompanying drawings.

A device for reducing pressure loss of a cyclone dust collector according to the first embodiment of the present invention is intended that a laminar flow means is disposed on an axial line of an air outlet passage 12 which is located inside a cyclone body 100. In this case, a cross blade 140 acts as the laminar flow means. The cross blade 140 is formed of two flat blade pieces 141 which cross each other. The cross blade 140 may be formed of three flat blade pieces which cross one another.

The cross blade 140 extends to an air inlet of the air outlet passage 120 where turbulence occurs remarkably. The air outlet passage 120 discharges the air through a hole 121 otter than a space where the cross blade 140 is attached. Accordingly, if a suction force occurs, indoor air and various kinds of foreign materials flow into the cyclone body 100 through the air inlet passage 110. At this time, the air and the foreign materials cyclonically rotate along an inner wall of the cyclone body 100.

The air having almost no mass collects on the center of the bottom of the cyclone body 100 to form discharge air. Thus, the air is discharged out through the air outlet passage 120.

At this time, the foreign materials heavier than the air cyclonically rotate along an inner circumference of the cyclone body 100 by means of its tare and moves downwardly, Then, the foreign materials pass through a foreign material outlet hole 100a to be collected into a collector tub 130.

In the above stage, relatively light fine dust is less in subject to a centrifugal force. Accordingly, the fine dust may be contained in the discharge air.

However, since the cross blade 140 extends to the end of the air outlet passage 20, a predetermined rotative force of the discharge air hits on each blade piece 141 of the cross blade 140 and then is lost, thereby forming a laminar flow.

The fine dust in the discharged air hits on each blade piece 141 of the cross blade 140. Thus, the fine dust springs off to the inner wall of the cyclone body 100. The fine dust is discharged into the collector tub 130 while being contained in the foreign materials rotating along the inner wall of the cyclone body 100.

For this reason, the discharge air discharged through the air outlet passage 120 flows desirably, and the fine dust is prevented from being collected into the discharge air. As a result, pure air can only be discharged out from the cyclone body 100. Turbulence occurring in an inlet of the air outlet passage 120 is remarkably reduced and the air is desirably discharged, thereby reducing noise and pressure loss of the discharge air.

Figure 6A:
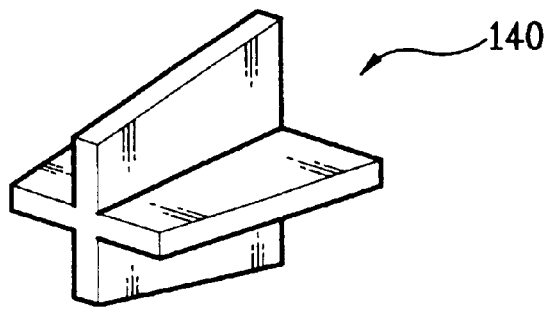
FIGS. 6a, 6b and 6c are perspective views showing various types of cross blades according to the first embodiment of the present invention.
Figure 6B:
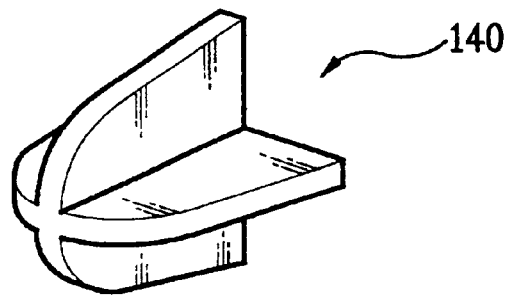
Figure 6C:
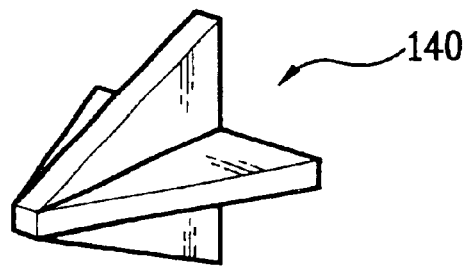

Meanwhile, the cross blade 140 is not limited to the first embodiment but may be formed of various shapes such as a rectangular shape, a triangular shape and an elliptical shape when viewed from its side as shown in FIGS. 6a, 6b and 6c.

A device for reducing pressure loss of a cyclone collector according to the second embodiment will be described with reference to FIG. 7.

Figure 7:
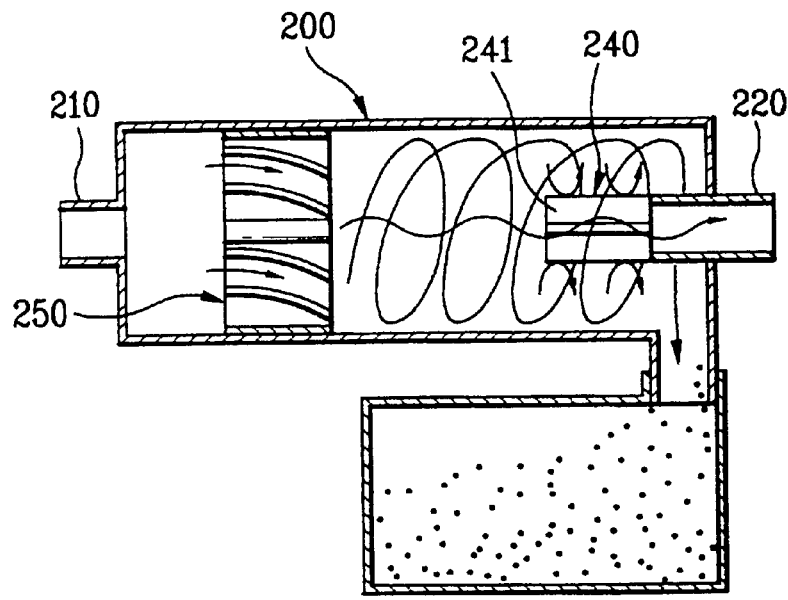
FIG. 7 shows a second embodiment of the present invention and is a longitudinal sectional view showing a forward cyclone dust collector, to which a cross blade is applied.

In FIG. 7, the cross blade is applied to a forward cyclone dust collector.

In the forward cyclone dust collector, a flow direction of air sucked through the air inlet passage 210 is identical to a discharge direction of the air discharged through the air outlet passage 220.

In the forward cyclone dust collector of the second embodiment of the present invention, the cross blade is required because a means 250 for giving a rotative force is provided inside the cyclone body 200 in which the air inlet passage 210 is located. That is to say, since the air discharged through the means 250 has a significant rotative force, there is a problem that the fine dust flowing in the cyclone body 200 is likely to be contained in the discharge air. In the forward cyclone dust collector of the second embodiment of the present invention, to solve such a problem, a cross blade 240 is provided at the end of the air outlet passage 220.

Accordingly, the discharge air discharged through the air outlet passage 220 hits on each blade piece 241 of the cross blade 240 so that its rotative force is reduced, thereby causing a laminar flow.

As a result, the discharge air only composed of pure air can be discharged, and pressure loss and flow noise due to turbulence can remarkably be reduced.

Figure 8:
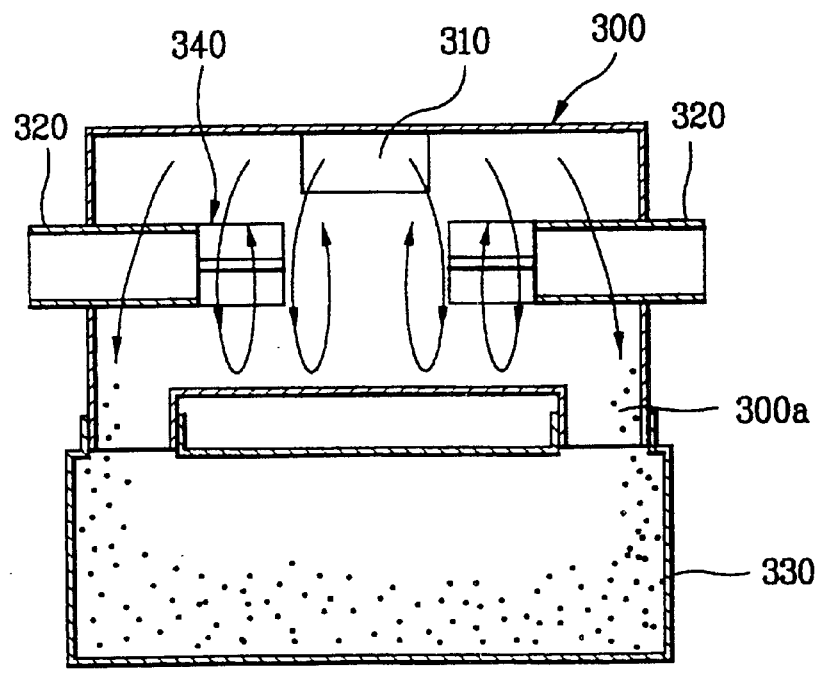
FIG. 8 shows a third embodiment of the present invention and is a longitudinal sectional view showing a bidirectional cyclone dust collector, to which a cross blade is applied.

The bidirectional cyclone dust collector to which the cross blade is applied will be described with reference to FIG. 8.

The bidirectional cyclone dust collector includes a cyclone body 300, an outlet 310 of an air inlet passage, an air outlet passage 320, and a collector tub 330. The outlet 310 is disposed around the center of the cyclone body 300. The air outlet passage 320 is respectively provided at both sides of the cyclone body 300, and the collector tub 330 is provided on a circumference at both sides of the cyclone body 300.

In other words, the bidirectional cyclone dust collector is configured in such a manner that indoor air and foreign materials are sucked into the center of the cyclone body 300 and then the air is only discharged out through both sides of the cyclone body 300.

In the third embodiment of the present invention, a laminar flow means, i.e., a cross blade 340 is disposed on the end of the air outlet passage 320.

The operation of the cyclone dust collector according to the third embodiment of the present invention will be described below.

If the suction force occurs in the cyclone body 300, the air containing the foreign materials is sucked into the cyclone body 300 through the air inlet passage 310. The inlet air and the foreign materials are separated from each other when discharged through the air outlet passage 320 disposed at both sides of the cyclone body 300.

In other words, the foreign materials having a predetermined mass rotate along the inner wall of the cyclone body 300 and are discharged to the collector tub 330 through a foreign material outlet hole 300a. The air having almost no mass is only discharged out through the air outlet passage 320.

At this time, the air discharged through the air outlet passage 320 partially includes a rotative force generated when the air is sucked into the cyclone body 300. Accordingly, the foreign materials rotating along the inner wall of the cyclone body 300 are partially contained in the discharge air having a predetermined rotative force. For this reason, it is likely that the fine dust contained in the discharge air is also discharged through the air outlet passage 320.

However, since the cross blade 340 is provided at the air inlet side of the air outlet passage 320, the rotative force contained in the discharge air hits on the cross blade 340 and thus is attenuated.

When the fine dust contained in the discharge air hits on the cross blade 340, the fine dust springs off from the cross blade 340 to the inner wall of the cyclone body 300. Thus, the fine dust is contained in the foreign material rotating along the inner wall of the cyclone body 300.

Therefore, the pure air is only discharged out through the air outlet passage 320 disposed at both sides of the cyclone body 300.

The discharge air from the air inlet side of the air outlet passage 320 is laminated to be desirably discharged, thereby reducing pressure loss and flow noise due to turbulence.

Figure 9:
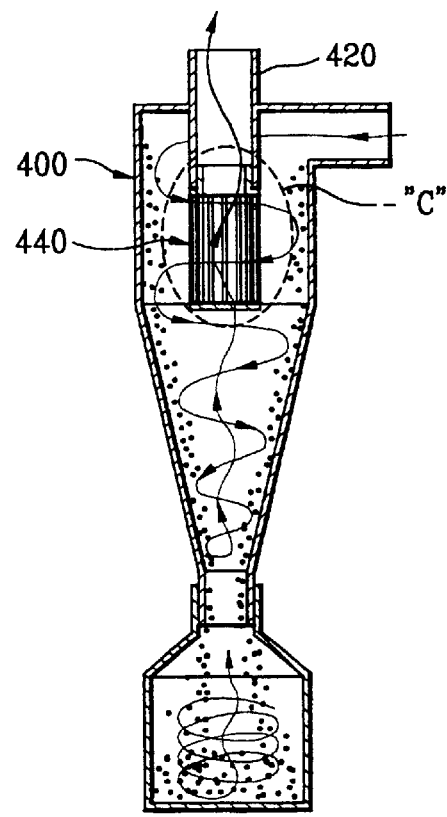
FIG. 9 shows a fourth embodiment of the present invention and is a longitudinal sectional view showing a reverse cyclone dust collector, to which a cylindrical blade is applied.
Figure 10:
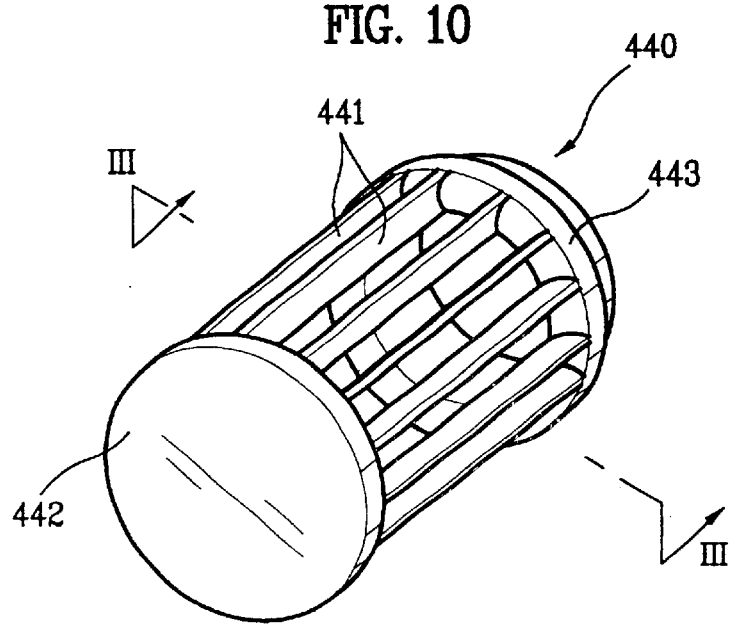
FIG. 10 is a detailed perspective view of a portion "C" of FIG. 9.
Figure 11:
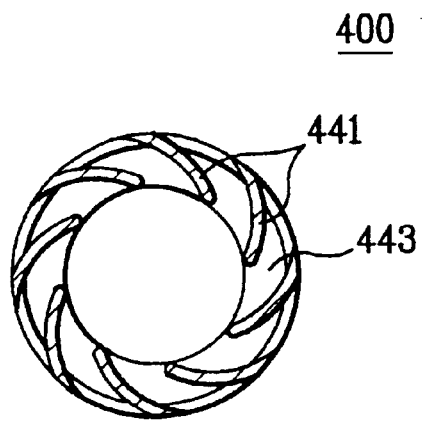
FIG. 11 is a sectional view taken along line III—III of FIG. 10.
Figure 12:
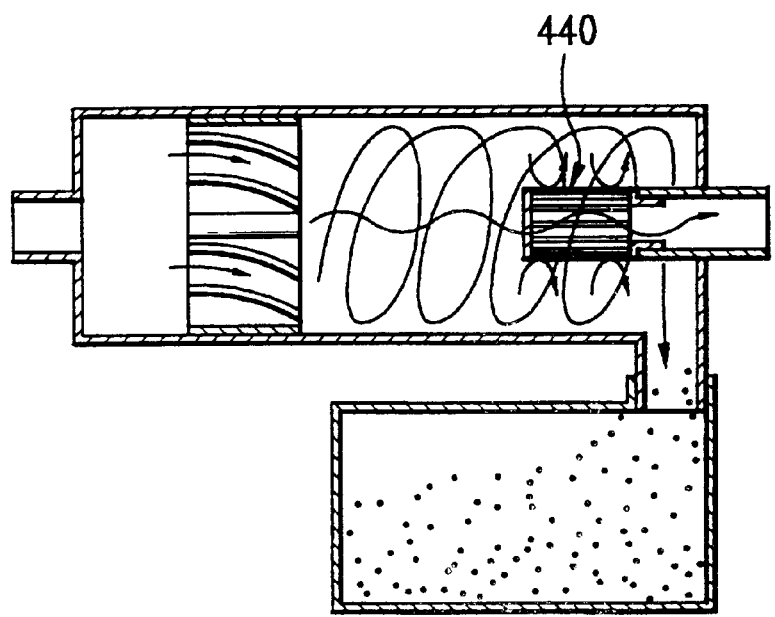
FIG. 12 is a longitudinal sectional view showing a forward cyclone dust collector, to which a cylindrical blade is applied.
Figure 13:
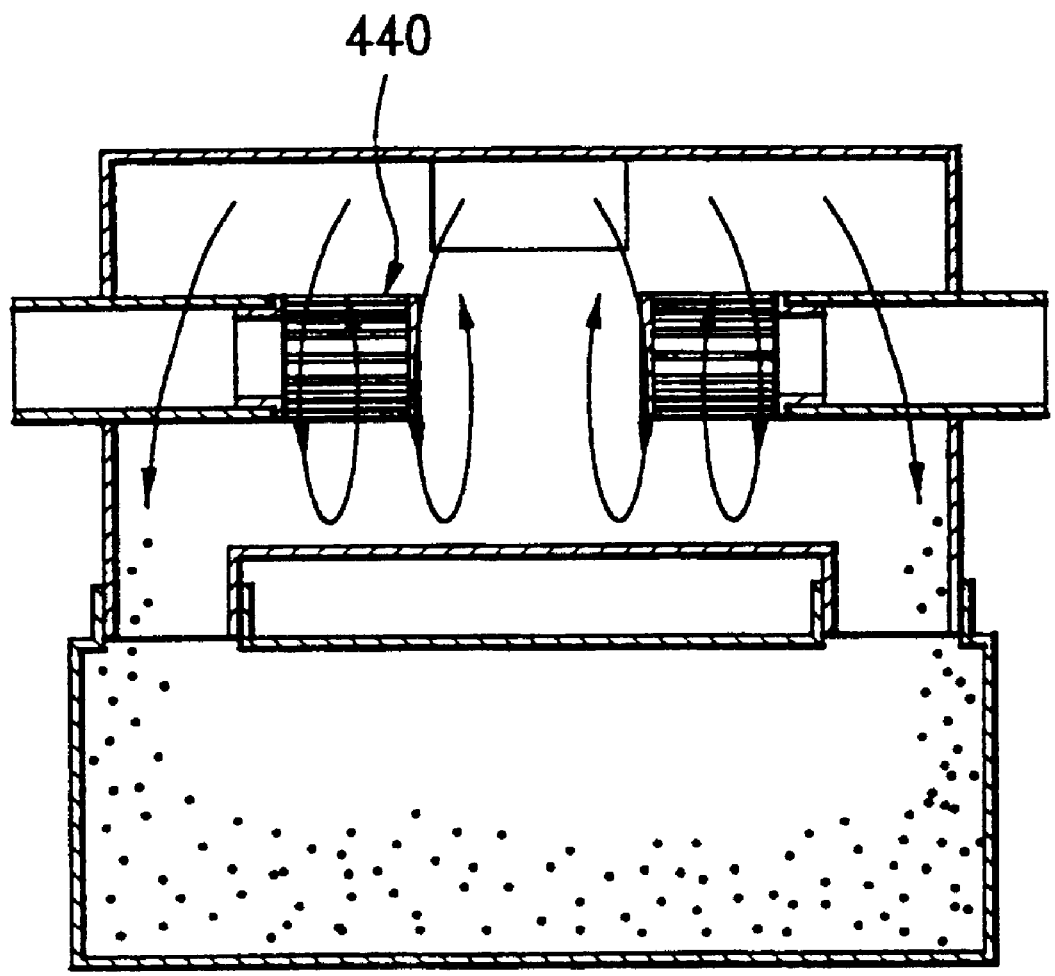
FIG. 13 is a longitudinal sectional view showing a bidirectional cyclone dust collector, to which a cylindrical blade is applied.
Figure 14:
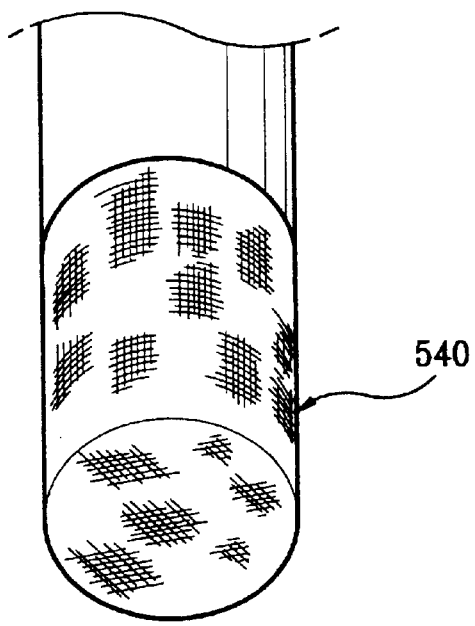
FIG. 14 is a perspective view showing another blade according to the present invention.
Figure 15:
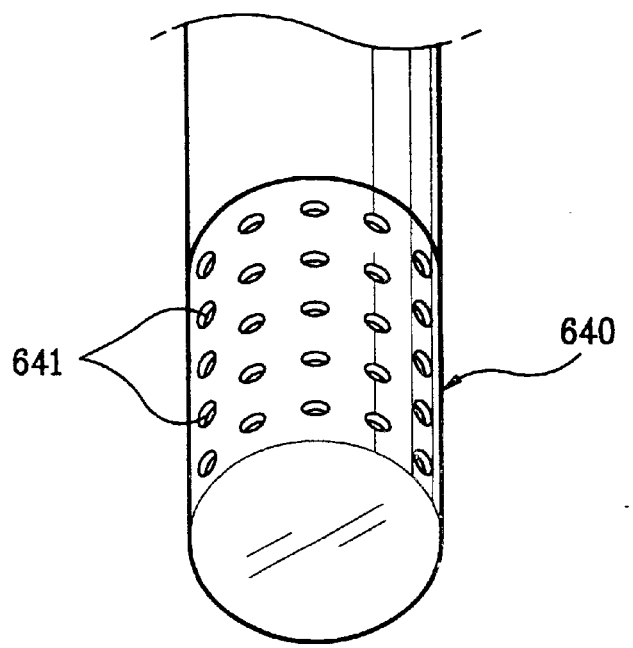
FIG. 15 is a perspective view showing other blade according to the present invention.

Another laminar flow means according to the fourth embodiment of the present invention will be described with reference to FIG. 9 to FIG. 11.

In this embodiment, a cylindrical blade 440 acts as the laminar flow means. The cylindrical blade 440 includes a plurality of blade pieces 441 having closed ends, spaced apart from one another.

In more detail, a first cylindrical shaped blade supporting portion 442 is provided at one side of the cylindrical blade 440, and a second blade supporting portion 443 having a through hole in the center is provided at the other side thereof. The first blade supporting portion 442 and the second blade supporting portion 443 face each other. The blade pieces 441 are inclined at a predetermined angle along a circumference of each inner side of the blade supporting portions 442 and 443. At this time, each blade piece 441 constituting the cylindrical blade 440 is inclined at a predetermined angle toward rotation direction of the foreign material rotating in the cyclone body 400. This structure is because that the discharge air can be laminated and at the same time the fine dust that may be contained in the discharge air can be prevented from being discharged.

In other words, a predetermined rotative force remains in the discharge air which is ascended from the bottom of the cyclone body 400 and discharged to the air outlet passage 420. Since the fine dust is partially contained in the discharge air, the discharge air hits on the cylindrical blade 440.

At this time, the respective blade piece 441 constituting the cylindrical blade 440 is inclined at a predetermined angle toward rotation direction of the discharge air. Therefore, the dust contained in the discharge air hits on the respective blade piece 441 so that the fine dust springs off to the inner wall of the cyclone body 440.

On the contrary, the air flows into an inner space of the cylindrical blade 440 through a hole formed between the respective blade pieces 441 while rotating along the circumference of the cylindrical blade 440. The air is then discharged out through the air outlet passage 420 communicated with the inner space of the cylindrical blade 440.

At this time, the discharged air loses its rotative force when the air flows into the inner space of the cylindrical blade 440. Thus, the discharge air can be laminated, thereby reducing pressure loss and noise.

The laminar flow means according to the present invention is not limited to the shapes illustrated in the aforementioned embodiments.

That is to say, a laminar flow means may be formed of a meshed type cylindrical body 540 or a perforation pipe 640 having a plurality of through holes 641 along its circumference.

Figure 16:
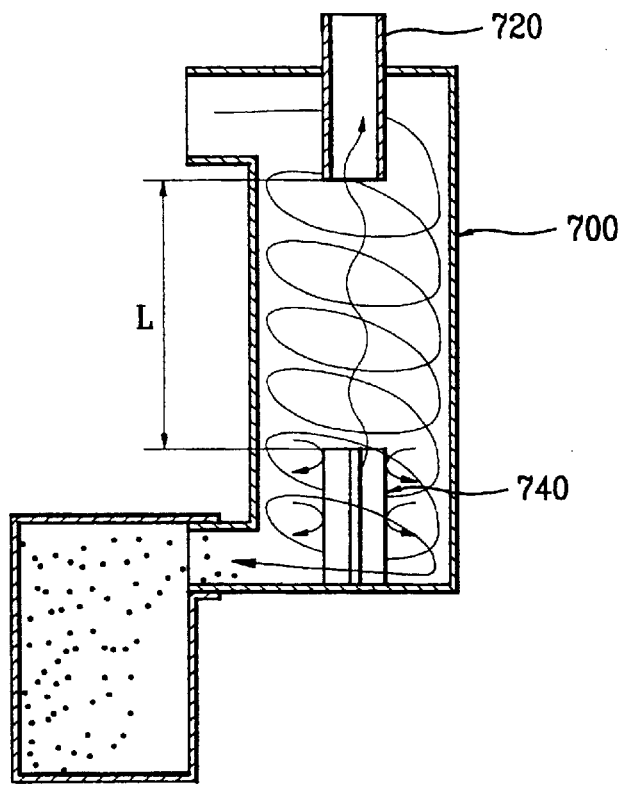
FIG. 16 shows a fifth embodiment of the present invention and is a longitudinal sectional view showing a reverse cyclone dust collector, to which a cross blade is applied.
Figure 17:
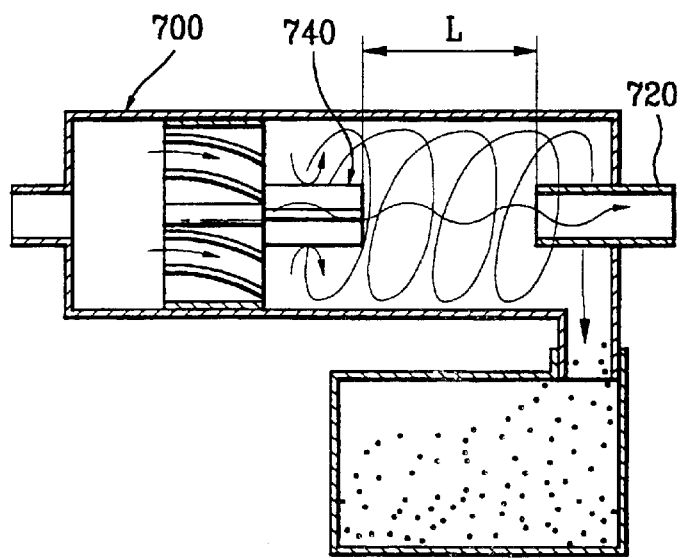
FIG. 17 shows a sixth embodiment of the present invention and is a longitudinal sectional view showing a forward cyclone dust collector, to which a cross blade is applied.

FIGS. 16 and 17 show the fifth embodiment of the present invention. In the fifth embodiment of the present invention, a cross blade 740 that acts as a laminar flow means is disposed on each portion of a cyclone body 700, opposite to the air outlet passage 720. In this structure, the rotative force of the discharge air can be removed when the air flowing in the cyclone body 700 is contained in the discharge air.

The cross blade 740 has a length 0.4~0.6 times as compared with the distance L between the air outlet passage 720 and the cross blade 740. This is because that the cross blade 740 is disposed in a position where the air sucked into the cyclone body 700 is contained in the discharge air, so that the discharge air can desirably be laminated, thereby reducing pressure loss.

If the length of the cross blade 740 is 0.4 times or below as compared with the distance L between the air outlet passage 720 and the cross blade 740, it is difficult to reduce pressure loss. If the length of the cross blade 740 is 0.6 times or greater as compared with the distance L between the air outlet passage 720 and the cross blade 740, it is difficult for the air to be contained in the discharge air. Accordingly, the length of the cross blade 740 should be determined within the range of 0.4~0.6 times of the distance L. Preferably, the length of the cross blade 740 is 0.5 times of the distance L.

The table 1 shows experiment results of pressure loss between the related art cyclone dust collector having no cross blade and the cyclone dust collector of the present invention having a cross blade 740.

TABLE 1

| | related art | present invention | | |
|---|---|---|---|---|
| | | 0.25*L | 0.5*L | 0.75*L |
| pressure loss (mmAq) | 450~400 | 370~350 | 310~280 | 375~340 |

In the above table, 0.25L, 0.5L and 0.75L mean that the length of the cross blade is 0.25 times, 0.5 times and 0.75 times of the distance L between the air outlet passage 720 and the cross blade 740. At this time, the direction of the wind was equally acted on each experiment at about 1.2 CMM(cubic meter per minute).

After all, as shown in the table 1, the cyclone dust collector of the present invention having the cross blade 740 has small pressure loss. Particularly, pressure loss is small when the length of the cross blade is 0.5 times of the distance L between the air outlet passage 720 and the cross blade 740.

Figure 18:
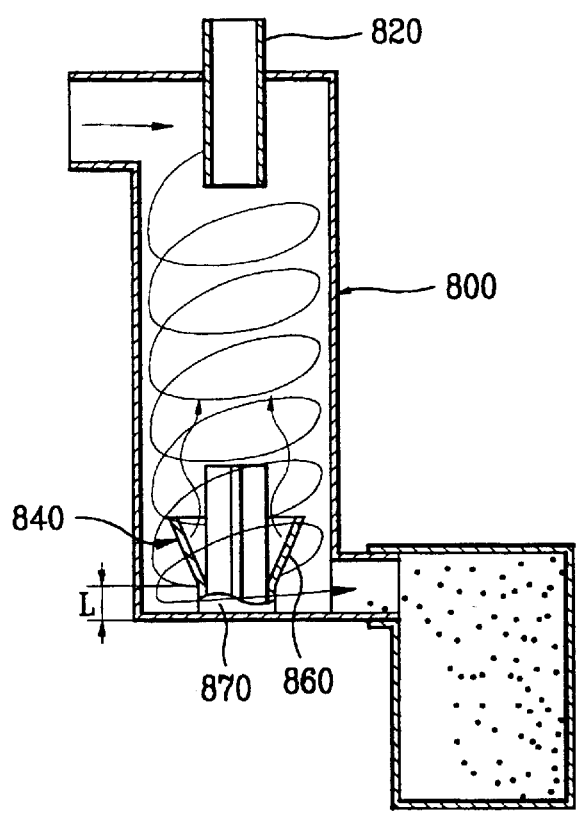
FIG. 18 is a longitudinal sectional view showing a sixth embodiment of the present invention.
Figure 19:
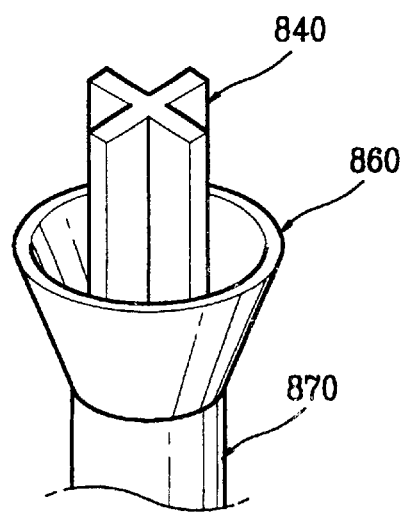
FIG. 19 is a detailed perspective view showing a portion "D" of FIG. 18.

Meanwhile, FIGS. 18 and 19 show the sixth embodiment of the present invention.

In the sixth embodiment of the present invention, an air flow guide portion 860 is disposed in an opposite side of a position where the air outlet passage 820 is disposed in a cyclone body 800. The air flow guide portion 860 has a skirt shape and extends to the air outlet passage 820. A cross blade 840 is provided on an inner side of the air flow guide portion 860. At this time, a supporting portion 870 is protruded between the air flow guide portion 860 and the inner wall of the cyclone body 800 so that a predetermined interval is formed between the air flow guide portion 860 and the inner wall of the cyclone body 800. This structure is intended that the discharge air is formed desirably by the air flow guide portion 860 and that the fine dust in the foreign materials rotating in the cyclone body 800 without being discharged out is prevented from being contained in the discharge air.

In other words, the air flow guide portion 860 is formed to be expanded toward the air outlet passage 820 and the rotation position of the dust is spaced apart at a predetermined interval H from the position where the discharge air is formed by the air flow guide portion 860. Accordingly, the discharge air can desirably be formed and the foreign materials can be prevented from being contained in the discharge air.

Furthermore, even though the fine dust is partially contained in the discharge air, the fine dust springs off by the cross blade 840 provided on the inner side of the air flow guide portion 860.

The discharged air not containing the fine dust is laminated by the cross blade 840 to reduce pressure loss.

INDUSTRIAL APPLICABILITY

As aforementioned, the device for reducing pressure loss of the cyclone dust collector of the present invention has the following advantages.

Since the laminar flow means is provided in the cyclone body, turbulence of the discharge air is avoided, thereby desirably discharging the air. This reduces pressure loss and noise due to pressure loss.

Furthermore, since the fine dust is prevented from being contained in the discharge air, collecting efficiency can be improved. Accordingly, the pure air is only discharged. As a result, a separate filter is not required in the vacuum cleaner.

Meanwhile, since the air flow guide portion is additionally formed in the cyclone body, the foreign materials can be prevented from being contained in the discharge air.

It will be apparent to those skilled in the art that various modifications and variations can be made in the device for reducing pressure loss of the cyclone dust collector of the present invention without departing from the spirit or scope of the invention. Thus, it is intended that the present invention cover the modifications and variations of this invention provided they come within the scope of the appended claims and their equivalents.

What is claimed is:

1. A device for reducing pressure loss in a cyclone dust collector comprising:

a cyclone body;

an air inlet passage connected with the cyclone body, for sucking air and foreign materials;

an air outlet passage for discharging the air sucked into the cyclone body;

a foreign material outlet hole for discharging the foreign materials separated from the air in the cyclone body; and a laminar flow device formed on an axial line along the air outlet passage, wherein the laminar flow means device is disposed to extend from an end of the air outlet passage.

2. The device as claimed in claim 1, wherein the laminar flows device is formed of a meshed type cylindrical body.

3. The device as claimed in claim 1, wherein the laminar flow device is formed of a perforated cylindrical body.

4. The device as claimed in claim 1, wherein the laminar flow device is formed of closed ends and a plurality of blade pieces spaced apart from one another.

5. The device as claimed in claim 4, wherein each of the plurality of blades is inclined at a predetermined angle toward a rotation direction.

6. A device for reducing pressure loss in a cyclone dust collector comprising:

a cyclone body;

an air inlet passage connected with the cyclone body, for sucking air and foreign materials;

an air outlet passage for discharging the air sucked into the cyclone body;

a foreign material outlet hole for discharging the foreign materials separated from the air in the cyclone body; and a laminar flow device formed on an axial line along the air outlet passage, wherein the laminar flow means device is disposed in an opposite position of a position where the air outlet passage is disposed in the cyclone body.

7. The device as claimed in claim 6, wherein the laminar flow device has a length which is 0.4–0.6 times of a distance between an inlet side of the air outlet passage and the laminar flow device.

8. The device as claimed in claim 6, wherein the laminar flow device has a length which is 0.5 times of a distance between an inlet side of the air outlet passage and its outlet side.

9. A device for reducing pressure loss of a cyclone dust collector comprising:

a cyclone body;

an air inlet passage connected with the cyclone body, for sucking air and foreign materials;

an air outlet passage for discharging the air sucked into the cyclone body;

a foreign material outlet hole for discharging the foreign materials separated from the air in the cyclone body;

an air flow guide portion disposed in an opposite side of a position where the air outlet passage is disposed in the cyclone body, having a skirt shape to extending toward the air outlet passage; and cross blade pieces provided on an inner side of the air flow guide portion to reduce a rotative force of the air, thereby forming a laminar flow.

10. The device as claimed in claim 9, further comprising a supporting portion protruded between the air flow guide portion and an inner wall of the cyclone body at a predetermined height.

* * * * *